United States Patent [19]

Robrock, II

[11] Patent Number: 5,392,402
[45] Date of Patent: Feb. 21, 1995

[54] BROADBAND INTELLIGENT TELECOMMUNICATIONS NETWORK AND METHOD EMPLOYING A RESOURCE SYSTEM TO SUPPORT NETWORK SERVICES

[75] Inventor: Richard B. Robrock, II, Bedminster, N.J.

[73] Assignee: Bell Communications Research, Inc., Livingston, N.J.

[21] Appl. No.: 84,386

[22] Filed: Jun. 29, 1993

[51] Int. Cl.[6] ............................................. G06F 13/00
[52] U.S. Cl. ........................ 395/200; 340/825.52; 370/60; 370/94.1; 370/60.1; 364/940; 364/942; 364/942.08; 364/942.6; 364/DIG. 2
[58] Field of Search ................... 395/200; 340/825.52; 370/60, 60.1, 62, 94.1, 94.2

[56] References Cited

U.S. PATENT DOCUMENTS

| | | | |
|---|---|---|---|
| 4,494,230 | 1/1985 | Turner | 370/60 |
| 5,117,429 | 5/1992 | Lagoutte | 370/60 |
| 5,222,085 | 6/1993 | Newman | 370/60 |

*Primary Examiner*—Robert L. Richardson
*Attorney, Agent, or Firm*—Leonard Charles Suchyta; Joseph Giordano

[57] ABSTRACT

A Broadband Intelligent Network employs an ATM fast-packet switch to route signaling cells from a calling party to a switch port directly connected to a Service Control Point (SCP). The signaling cells carry a service request that requires the support of a network resource, and, in the specific case described herein, the support of the Line Information Data Base (LIDB) to facilitate the establishment of a switched virtual connection to a called party. The SCP acts on the information in the signaling cells and selects the required resource, i.e., the LIDB, and then sends a query cell(s) to the LIDB through a permanent virtual connection in the ATM switch. The LIDB, in turn, acts on the information in the query cell(s) to assemble a response cell(s) with the requested information. The response cell(s) is sent to the SCP through the permanent virtual connection in the ATM switch, thereby enabling the SCP to complete call processing, establish the requested connection, and generate a billing record.

32 Claims, 13 Drawing Sheets

| 202 | 200 | 201 |
|---|---|---|
| PAYLOAD | | HEADER |
| FUNCTION REQUESTED<br>BILLING NUMBER<br>CALLING CARD<br>CALLED NUMBER<br>CALLING NUMBER | | CONTAINS VPI/VCI<br>FOR PERMANENT VIRTUAL<br>CIRCUIT BETWEEN BIN-SCP<br>(BIN-ISCP) ON PORT t<br>AND LIDB ON PORT m |

FIGURE 6A

| 206 | 204 | 205 |
|---|---|---|
| PAYLOAD | | HEADER |
| COMPANY IDENTIFIER<br>RECORD STATUS INDICATOR<br>CALLING CARD SUB-ACCOUNT NUMBER<br>PIN RESTRICTION INDICATOR<br>REVENUE ACCOUNTING OFFICE<br>PRIMARY PREFERRED IC INDICATOR<br>ALTERNATE PREFERRED IC INDICATOR<br>PREFERRED INTERNATIONAL CARRIER INDICATOR | | CONTAINS VPI/VCI<br>FOR PERMANENT VIRTUAL<br>CIRCUIT BETWEEN<br>LIDB ON PORT m<br>AND BIN-SCP(BIN-ISCP)<br>ON PORT t |

FIGURE 6B

BROADBAND INTELLIGENT TELECOMMUNICATIONS NETWORK AND METHOD EMPLOYING A RESOURCE SYSTEM TO SUPPORT NETWORK SERVICES

The present invention relates to broadband intelligent telecommunications methods and networks, and more particularly to the integration of resources in such networks to support network-based services.

In the operation of a telecommunications network, it is often desirable to employ one or more data bases or other resources to support the handling of calls or to provide other network services. For example, a data base, called the Line Information Data Base (LIDB), is part of the infrastructure that facilitates call handling in the United States circuit-switched telephone network.

LIDB was initially developed to support Alternate Billing Services for the Local Exchange Carriers in the circuit-switched network. Alternate Billing Services include Calling Card Service, collect calling and bill-to-third-number calling. In support of Alternate Billing Services, LIDB data bases have been deployed throughout the serving areas of the seven Regional Bell Operating Companies and a number of independent telephone companies. Approximately 200 million customer records have been entered into the deployed LIDBs; virtually all telephone lines and Calling Cards in the United States are recorded therein. The LIDBs are currently handling many millions of queries per day in support of Alternate Billing Services and other services.

The LIDBs support Alternate Billing Services in the circuit-switched network by receiving queries from Operator Services Systems through the Signaling System 7 (SS7) common channel signaling network (CCSN). Regional CCSN networks are interconnected so that an Operator Services System in one region can query the LIDB data base of any other region.

The LIDBs have also been applied to various other services. Examples are Calling Name Delivery Service and PIN Validation for customer-controlled service activation. With Calling Name Delivery service, a calling number is translated to a name that may be displayed at the location of the called party. With a customer-controlled service activation system, customers can call a mechanized service representative at any time to add, change, or delete services. For security reasons, PIN Validation is needed to use the service activation system, and it employs the X.25 network to carry PIN-validation queries to a regional LIDB where the entered PIN number is checked against the calling party's directory number.

Accordingly, the LIDB is an extensive telecommunications data base for which a large investment cost has been incurred, and it has significant utility as a resource for service support in the circuit-switched telecommunications network.

A new type of telecommunications network, known as a fast-packet network, allows all digital, broadband, multimedia communication between calling and called parties. However, fast-packet networks have generally had no network control available for the implementation of network call handling services with or without data base support.

An improved fast-packet network providing intelligent network control of call handling and other network services is disclosed in the following copending applications, both of which are assigned to the present assignee and are hereby incorporated by reference: Ser. No. 08/063,661, entitled "Intelligent Broadband Communication System and Method", filed by Richard B. Robrock on May 20, 1993 and Ser. No. 08/069,243, entitled "Intelligent Broadband Communication System and Method", filed as a Continuation-in-Part application of Ser. No. 08/063,661 by Richard B. Robrock on May 28, 1993.

The improved fast-packet network disclosed in the above copending applications is referred to as a broadband intelligent network (BIN). A need has existed to integrate a network resource system, i.e., one or more existing or new data bases or other resources, into the BIN in an efficient and economic manner so that resource support can be provided for BIN-controlled services. Although the prior art has provided for the deployment of data bases like the LIDB in the circuit-switched network, it fails to provide any disclosure or suggestion regarding efficient and economic implementation of resource support for network-controlled services in fast-packet networks.

DISCLOSURE OF THE INVENTION

Accordingly, the present invention is directed to a fast-packet network or BIN in which data base or other resource support is provided for network-controlled services.

In accordance with the invention, a broadband intelligent network comprises means for routing data packets (cells) through multi-ported fast-packet switches. Means are provided for managing connections between the ports to establish switched or permanent virtual connections between the ports. Means are provided for coupling customer apparatus through connections having a relatively broad digital bandwidth to predetermined switch ports to transport cells to and from the customer apparatus. Means are provided for processing customer service request data extracted from received signaling cells and providing network-controlled responses thereto. Means are further provided for interfacing the network control processing means to at least one of the switch ports. The managing means further detects each signaling cell received by the fast-packet switching means and routes each signaling cell to the processing means through the one switch port. Means are provided for controlling at least one resource unit of a network resource system, and the resource unit controlling means is directly connected to a port of the fast-packet switching means to receive query cells from the processing means and to transmit responses thereto. The processing means detects service request data in each received signaling cell requiring support of the one resource unit and generates at least one output query cell requesting information needed from the one resource unit for support of the requested service and sends the query cell to the fast-packet switching means for routing to the one resource unit. The resource unit controlling means acts on information in the query cell to generate a response cell containing requested data and sends the response cell to the fast-packet switching means for routing to a defined network address.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages, and principles of the invention. In the drawings:

FIGS. 6A and 6B respectively show graphical representations of ATM query and response cells employed in the BIN of FIG. 4 for Calling Card validation;

BEST MODE FOR CARRYING OUT THE INVENTION

In accordance with the present invention, a broadband intelligent-network (BIN) employs one or more data bases or other resource units to support customer service requests. Examples of the present preferred embodiments of the invention are illustrated in the accompanying drawings and will now be described in detail.

Figure 1:
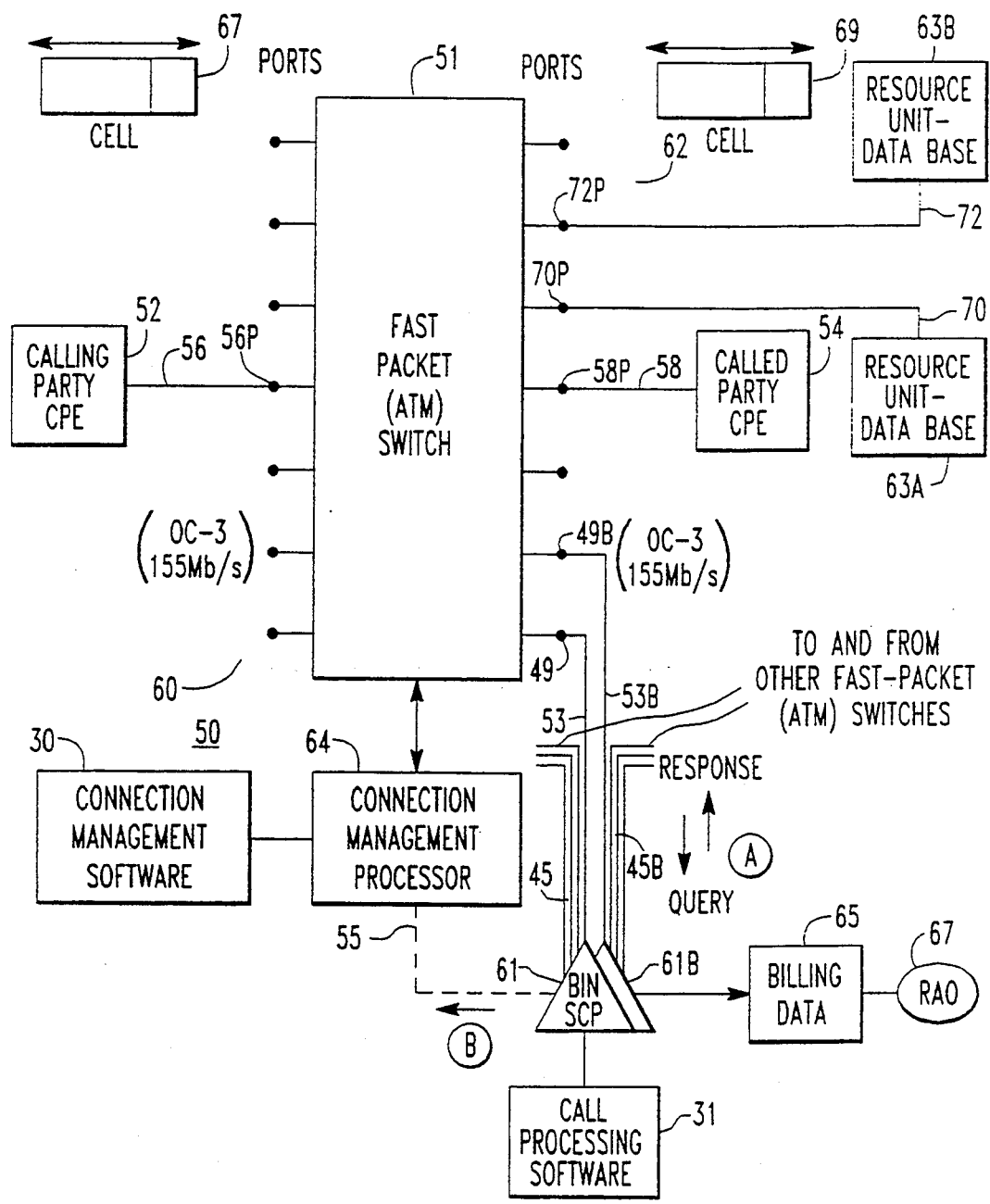
FIG. 1 is a system block diagram of a BIN employing a fast-packet or ATM switch arranged in accordance with the invention in a first preferred embodiment in which a resource system is integrated to support network-controlled services.

In FIG. 1, a BIN 50 of the invention is based on fast-packet network technology. As used herein, a fast-packet network means a network that transports digital data in packets at high transport rates (typically megabits per second) with sub-millisecond switch delays and without retransmission of erroneous packets.

The BIN 50 preferably includes a fast-packet switch 51 preferably in the form of an ATM switch 51, a connection management processor 64 having connection management software 30, a network control system called a BIN Service Control Point (BIN-SCP) 61, a backup BIN-SCP 61B, respective resource units, specifically represented as data bases 63A and 63B, and a regional accounting office (RAO) 67, to which billing data 65 is transmitted from the BIN-SCP 61.

As used herein, the term "resource unit" means a facility that contains recorded information such as voice information, image or video information, program information, or user or corporate data. The term "data base" means a resource unit that contains data useful in supporting customer services, especially customer call connection services.

Service request or call processing software 31 is provided for the BIN-SCP 61. The BIN-SCP 61 is structured as described in the copending application Ser. Nos. 08/063,661 and 08/069,243.

Each customer has customer premises equipment (CPE) that is connected directly or indirectly to an ATM fast-packet switch port. A calling party CPE 52 and a called party CPE 54 are representatively shown with respective ATM switch port connections 56 and 58.

The data bases 63A and 63B are representative of a resource system 63 that may include a plurality of separately accessible data bases or other resource units (not shown) at various locations. Resource information needed for a particular network service may reside in the BIN SCP 61 or at a separate resource unit location, or such information may reside in a plurality of geographically distributed resource units or data bases. For example, the data base 63A can be a LIDB interfaced in accordance with the invention for operation in the BIN 50.

The fast-packet switch 51 has a plurality of two-way ports 60 and 62, each of which may be provided with fiber optic links 56 and 58, respectively, to subscribers. A fiber optic link or connection herein means a connection established wholly or partly using fiber optic facilities. Each fiber optic link 56 or 58 can provide connections for multiple subscribers.

The fast-packet (FP) switch 51 can be embodied in various forms, with some variation in the manner in which transmitted data is organized. For example, current state-of-the-art FP switches include asynchronous transfer mode (ATM) switches (data organized in fixed-length packets called "cells"), SMDS switches, and frame relay switches. Accordingly, as used herein, the term "cell" means a basic data packaging unit regardless of whether the unit is called a "cell", a "packet", or other name in the particular technology used to apply the invention.

In the preferred embodiment(s) of the invention, ATM switches are employed for fast-packet switching. An ATM switch is a connection-oriented switch, which may have up to 1000 or more ports, employs virtual connections, and operates with fixed length data packets (cells). ATM switches can handle signals with transport rates of 155 Mb/s or greater and they introduce only sub-millisecond delays in transit time and in delay variability. The maximum expected delay through an ATM switch is 150 microseconds.

The asynchronous transfer mode used in ATM switches is a CCITT standard for packaging, multiplexing, and switching end user digital information in fixed length data packets (cells), 53 bytes (octets) in length. The data cell, indicated at 67 and 69 in FIG. 1, includes a header, to which 5 bytes are assigned, and a payload portion, to which 48 bytes are assigned.

The cell header normally contains both a Virtual Path Indicator (VPI) and a Virtual Channel Indicator (VCI). VPIs and VCIs are used to determine the routing of cells through permanent or switched virtual connections. These connections are termed virtual because they exist in the physical sense only for as long as a message traverses the ATM switch.

The self-routing ATM switch uses the port identity and the VPI/VCI of incoming cells to establish the proper output port to which each cell should be routed based on lookup tables. The lookup or translation tables tie a cell from a particular input port with a particular label, to a specified output port with a different label.

Signaling cells are preferably used to establish switched virtual connections through the ATM switch 51. As used herein, a "signaling cell" may be a single cell or a sequence of cells. Preferably, a signaling cell has the same format as the ATM cells described above. Signaling cells generated by a calling CPE request a particular service and contain the information in their payload necessary to provide the requested service, such as to complete a connection to another CPE, i.e., calling party address, called party address, billing information, digital bandwidth required, personal identification number (PIN), Calling Card number, etc. Signaling cells can be identified by unique values of the VPI and VCI or by a unique payload type code. If desired, the recently developed Q.93B signaling protocol may be used with the BIN 50.

In the BIN 50, the BIN-SCP 61 is connected to a port 49 of the ATM switch 51, preferably through a direct fiber optic link 53. If the ATM switch 51 is handling OC-3 at 155 Mb/s, as shown, the interface with the BIN-SCP 61 is preferably at the same 155 Mb/s rate. Preferably, a backup BIN-SCP 61B is connected to ATM switch port 49B through direct connector 53B to provide network-controlled services with extremely high reliability. If the BIN SCP 61 fails, the BIN SCP 61B immediately takes control of network services.

As indicated by the respective reference characters 45 and 45B, the primary and backup BIN-SCPs are also preferably directly connected to ports of other ATM switches (not shown) to avoid problems of sectional outages. In an alternate embodiment, routing to (or from) other ATM switches can be through the ATM switch port 49 or 49B and through a permanent virtual connection in the ATM switch 51 to the destination ATM switch (not shown). Permanent virtual circuits would also be established in the destination and any intermediate ATM switches.

The respective data bases 63A and 63B of the resource system are connected to respective ATM ports through direct links 70 and 72. Accordingly, queries can be sent from the BIN-SCP 61 to the data base 63A or 63B to obtain return responses that provide data needed for processing customer service requests.

The BIN 50 employs the resource system 63 in providing network-controlled services for calling and called parties. The BIN-SCP 61 controls access to resource units including the data bases 63A and 63B to support a variety of customer services. The BIN-SCP 61 controls resource unit access in accordance with the requirements of specific customer service requests and the content of various resource units or data bases within the resource system 63.

As considered subsequently herein in greater detail, the resource system 63 preferably includes a LIDB system presently used in the circuit-switched telephone network and adapted for operation with a fast-packet network, i.e., the BIN 50. Accordingly, with LIDB support, the BIN-SCP 61 is able to provide Calling Card service, billed-number screening, PIN validation, calling name delivery service, originating line number screening, etc.

Other data bases or other resource units can be included in the BIN resource system 63 to provide requested data to a calling party. For example, an 800 services data base could be accessed to translate an 800 number to a physical telephone number.

Figure 3:
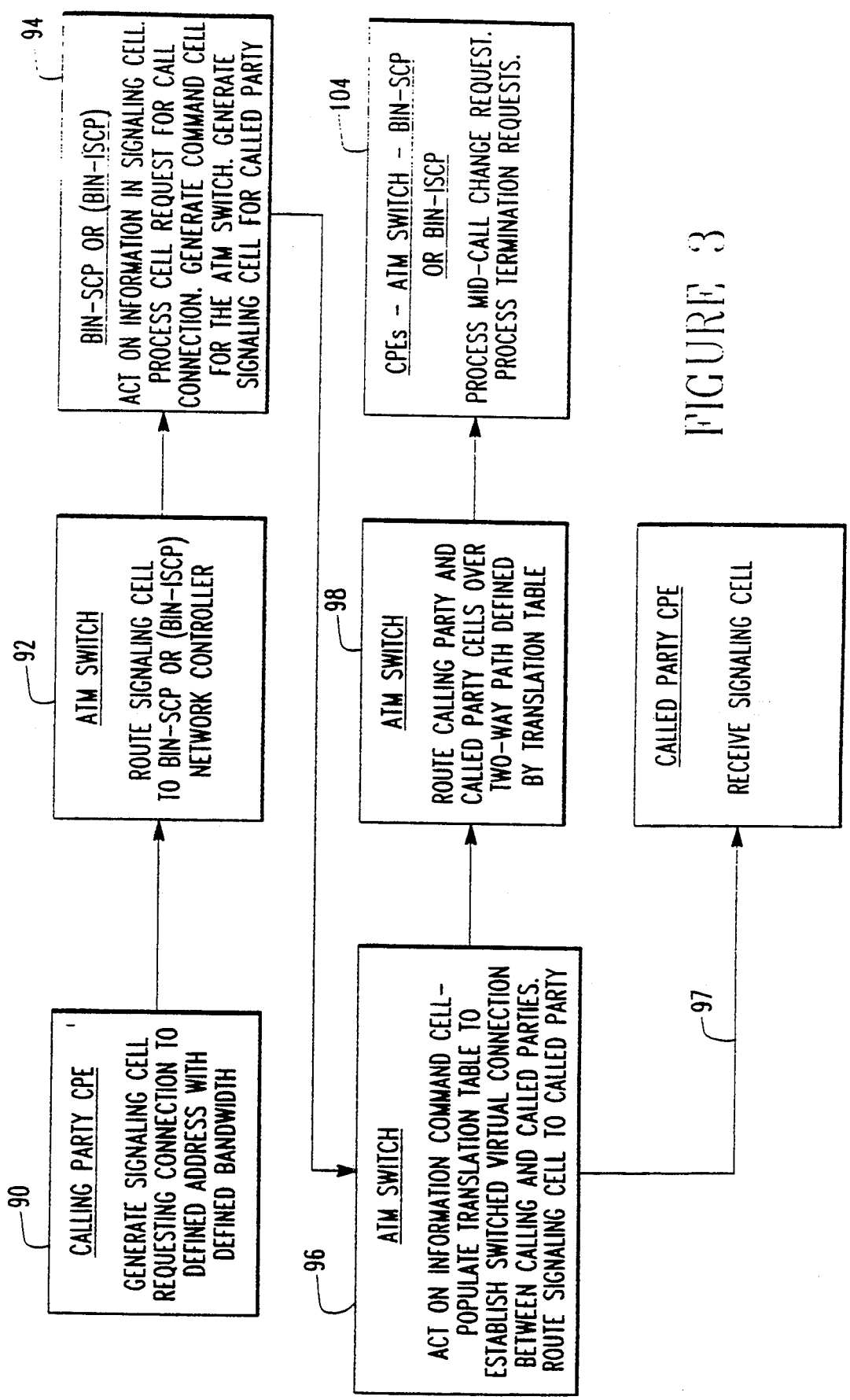
FIG. 3 is a functional block diagram that illustrates the operation of the system of FIGS. 1 or 2 when a request has been made for a call connection service.

The operation of the BIN 50 in establishing a call connection is illustrated by the functional block diagram in FIG. 3. As indicated in block 90, the calling party CPE 52 (FIG. 1) generates a signaling cell to request a connection to a called party 54 at a defined address (directory number) with a defined bandwidth (e.g., voice, data, image, or video).

As shown for block 92, the ATM switch 51 routes the signaling cell to the BIN-SCP 61 which, in block 94, acts on the cell information and processes the request for a call connection and thereafter generates a command cell for the ATM switch 51 to establish the connection. In addition, a signaling cell is generated for the called party.

The ATM command cell and the called party signaling cell are sent directly to the ATM switch 51 through port 49 (FIG. 1) as indicated by block 96. In response to the ATM command cell, the connection management processor of the ATM switch 51 acts on information in the command cell and populates its translation table in accordance with the received command, thereby establishing a two-way switched virtual connection between ATM ports 56P and 58P of the calling and called parties. In addition, the signaling cell generated by the BIN-SCP 61 is immediately routed through the ATM port 58P to the called party as indicated by the reference character 97 (i.e., through the path 58 in FIG. 1).

As indicated in block 98, once the called party answers the call, the ATM switch 51 routes calling and called party cells 67 and 69 (FIG. 1) through a two-way, switched virtual path. The translation table defines the two-way path so that each party receives the voice, data, image and/or video cells transmitted by the other party.

As represented by block 104, system elements of the BIN 50 can be operated during the call to process mid-call bandwidth changes or other requests or to process a call termination request. Thus, the CPEs 52 and 54, the ATM switch 51, and the BIN-SCP 61 are operated to establish call changes or a call termination in a manner similar to that described for the original connection service. BIN operations to establish call connections, make mid-call changes, and terminate calls are more fully explained in the aforementioned patent applications Ser. Nos. 08/063,661 and 08/069,243.

Figure 5:
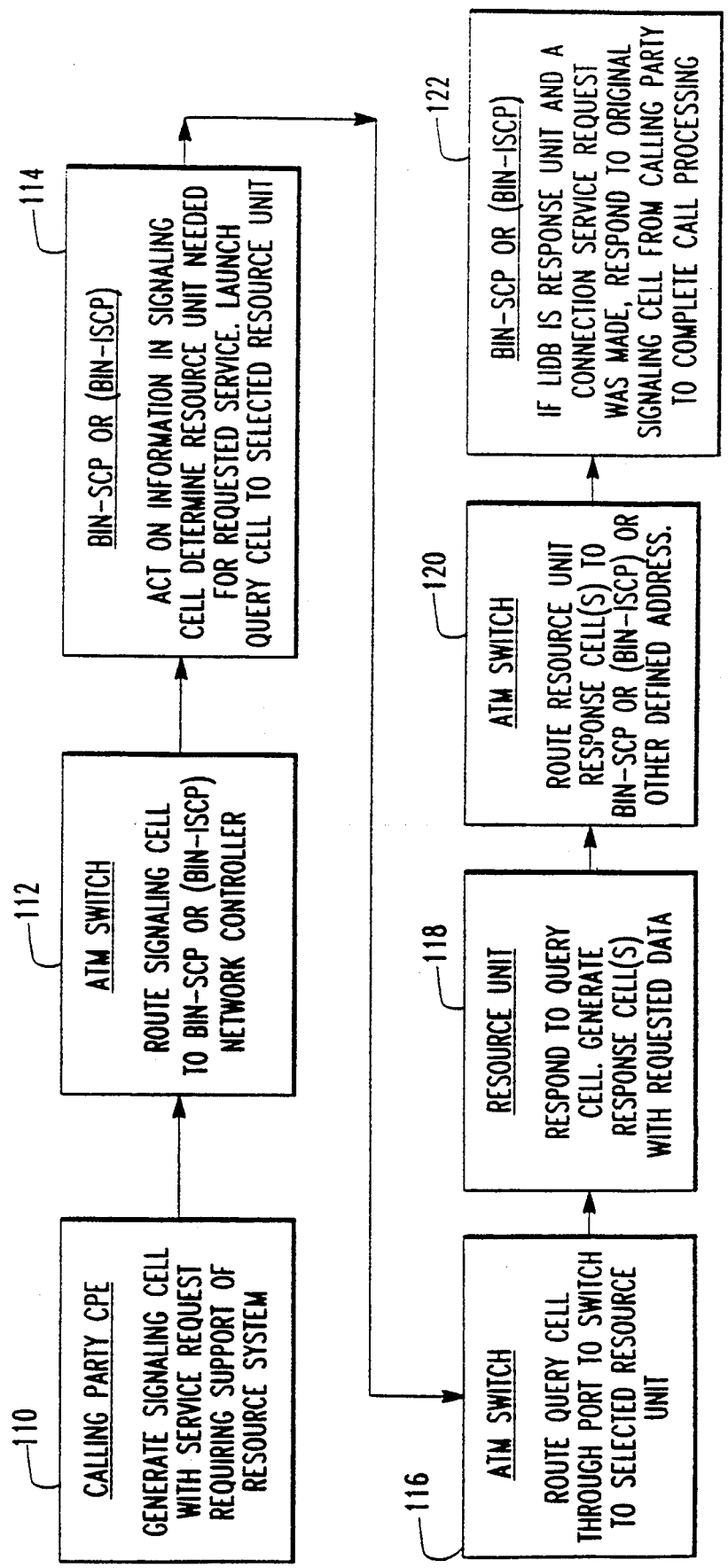
FIG. 5 is a system functional block diagram that illustrates the operation of the system of FIGS. 1 or 2 when a service request has been made that requires resource support.

The operation of the BIN 50 in providing network-controlled service with resource unit support is illustrated by the functional block diagram in FIG. 5. In block 110, the calling party CPE 52 (FIG. 1) generates a service request requiring support of the resource system. In block 112, the customer signaling cell is input through the port 56P to the ATM switch 51 which routes the signaling cell to the BIN-SCP network controller 61 for processing.

As indicated by block 114, the BIN-SCP 61 receives the customer signaling cell and acts on the information in it. If the requested service requires access to a resource unit, the location of the resource unit needed for the requested service is determined.

If the determined data base or other resource unit is directly accessible by the BIN-SCP 61 through a data link or other means, a query is directly sent to the selected resource unit to obtain the required data. If the determined resource unit is not directly accessible, a query cell is generated and sent by the BIN-SCP 61 to port 49 of the ATM switch 51 for delivery through port 70P or 72P (FIG. 1) to the selected resource or data base unit 63A or 63B as indicated by block 116.

Preferably, a permanent virtual connection is created between the BIN-SCP 61 and each resource unit 63A or 63B because of the frequency with which the connection is used, coupled with a desire for better response time. Alternatively, a switched virtual connection can be established between the port 49 of the BIN-SCP 61 and the port 70P or 72P of the data base 63A or 63B.

In the preferred embodiment, the BIN-SCP 61 (or BIN-ISCP) establishes the permanent virtual circuit in the ATM switch 51 between the BIN-SCP 61 (or BIN-ISCP) and a resource or data base unit when the resource unit or data base is first added to the network. For this purpose, the BIN-SCP 61 or (BIN-ISCP) supplies translation data for the permanent virtual circuit to configuration management software of the ATM switch 51.

Figure 7:
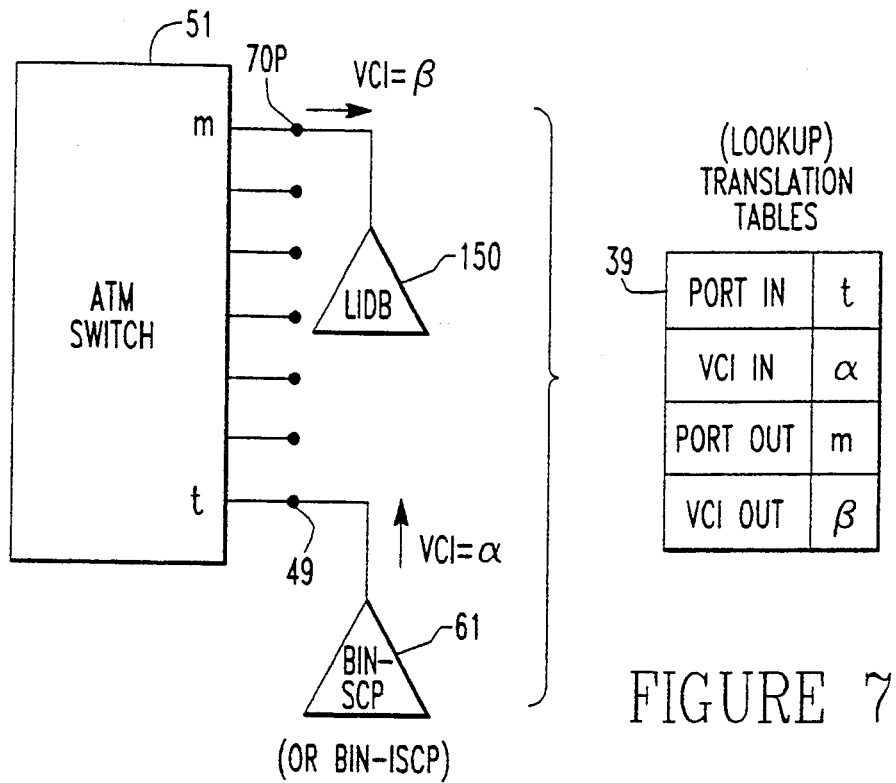
FIG. 7 illustrates a translation table employed in an ATM switch of the BIN of FIG. 4.

As shown in FIG. 7, a translation table 39 stored in the connection management processor 55 is populated with port and labels (VPI/VCI) information that defines virtual switch connections. In the preferred case of a permanent two-way virtual connection from the BIN-SCP 61 to a resource unit or data base, entries are permanently contained in the table 39. Thus, as shown in FIG. 7, labels for the permanent virtual circuit are Port In t, VCI In α, Port Out m, VCI Out β, and vice versa for the opposite path direction.

Referring back to FIG. 5, the resource unit 63A or 63B receives the query cell and responds to it by generating one or more response cells with required data as shown in block 118. The information required for a response may require the use of a single cell, a few cells, or many cells. Accordingly, the term "response cell" as used herein is intended to mean a single response cell or multiple response cells. In turn, the resource unit response cell is routed (block 120) by the ATM switch 51 to the BIN-SCP 61 or to another defined address depending on the customer requested service. If a call connection has been requested, and the queried data base is a LIDB, the LIDB response cell is sent to the BIN-SCP 61 for completion (block 122) of call processing.

In FIG. 6A, an ATM query cell 200 represents a query cell generated by the BIN-SCP 61 for Calling Card validation in the process of establishing a call. The cell is identified by data in a header section 201 and the amount of information included in the payload section 202 depends, for example, on the dialing plan employed and may require that two or more cells be used to provide a "query cell". Accordingly, a "query cell" is defined herein to mean one or more cells as necessary to create a query.

An ATM response cell 204 shown in FIG. 6B represents a response cell generated by a LIDB in response to a Calling Card validation query. Information used in call processing is included in a payload section 206. A header section 205 includes identification data.

To provide LIDB tracking of queries, a label can be included in the query cell payload to identify the ATM switch or BIN-SCP launching the query. Alternatively, the LIDB design can be suitably arranged to perform this function.

The processing of collect calls and bill-to-third-number calls requires other LIDB responses in support of call processing. Thus, ATM query and response cells similar to the cells 200 and 204 are employed, for example, for originating line number screening, calling name delivery, and billed number screening.

In a preferred specific embodiment of the invention (FIG. 4), the LIDB system of the circuit-switched telephone network is adapted to be included in the resource system 63 for call handling support in a BIN 50L. The prior art LIDB system will first be explained as it currently exists in the circuit-switched telephone network to facilitate an understanding of its integration into the operation of the BIN 50L in accordance with the invention.

Figure 8C:
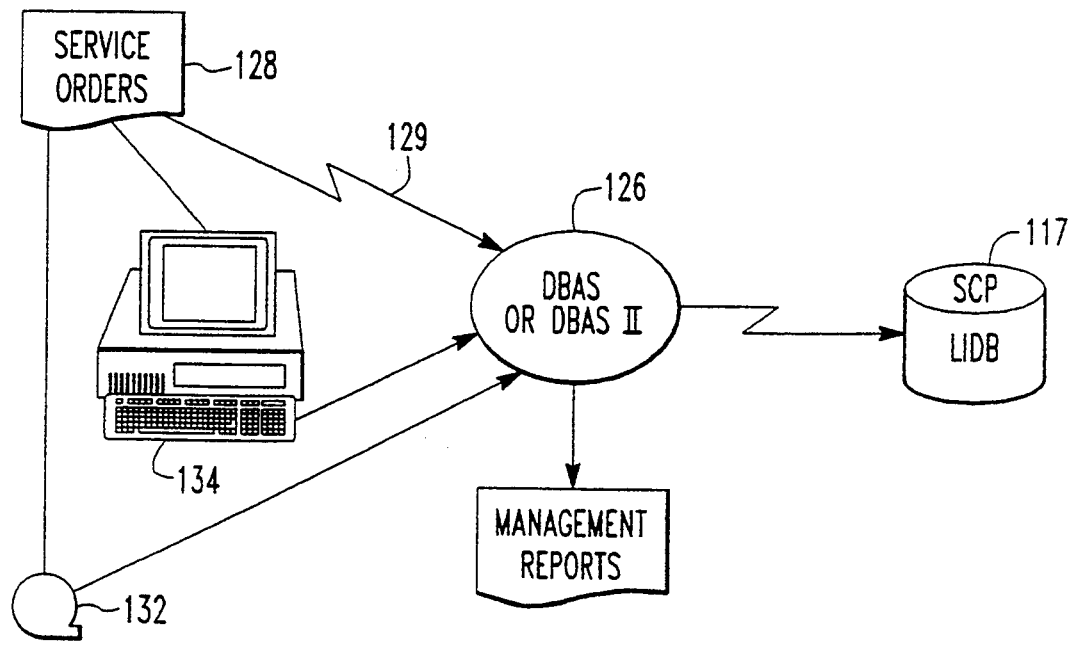
FIGS. 8A, 8B, and 8C illustrate the prior art structure of LIDBs employed in the circuit-switched telephone network.
Figure 8A:
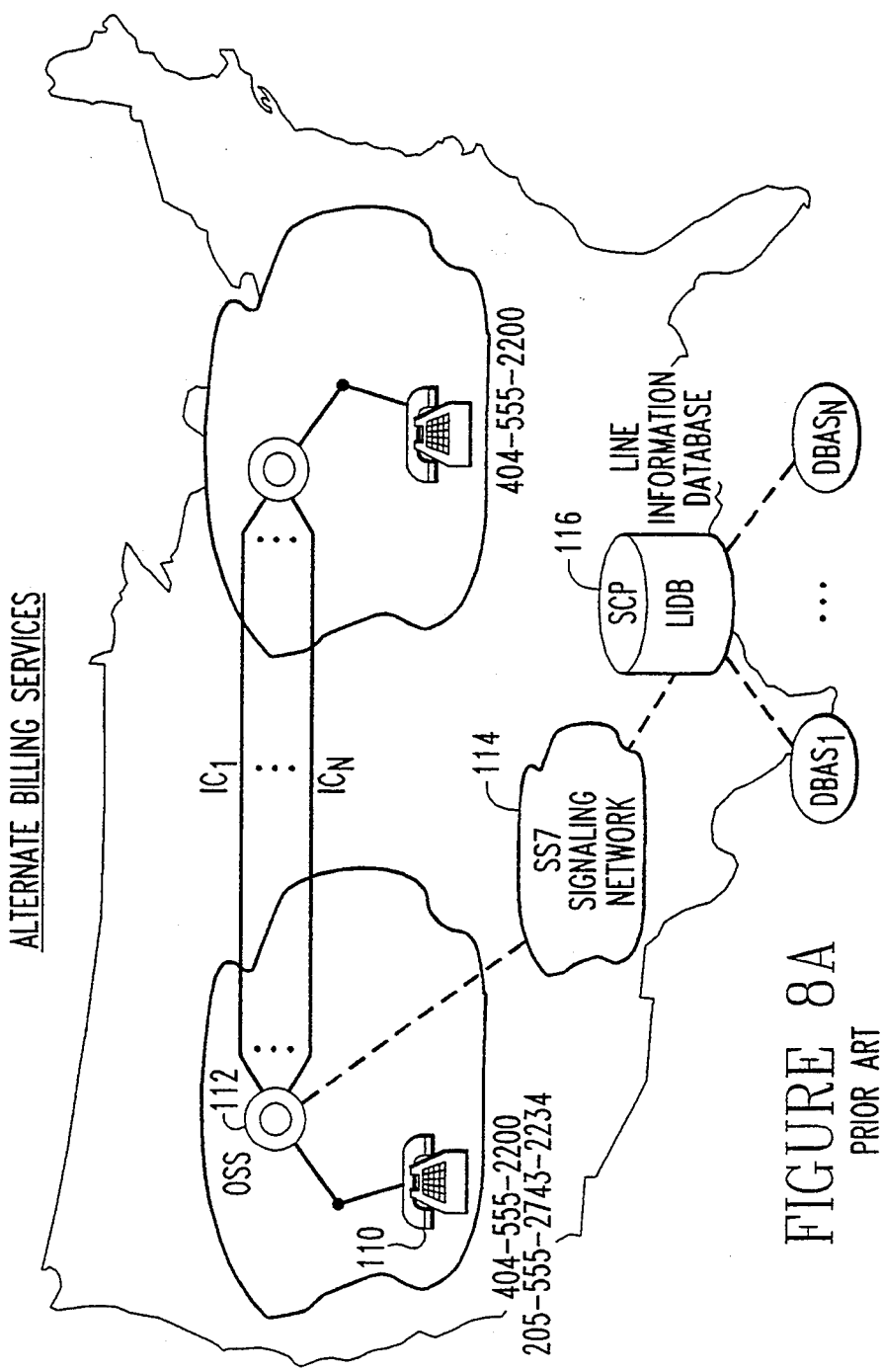

The prior art LIDB is an application that runs on the Service Control Point (SCP) platform in the circuit-switched telephone network. At present, the primary use of the LIDB data base is in support of Alternate Billing Services (ABS) which include Calling Card Services, collect calling and bill-to-third-number calling. The network architecture supporting ABS is shown in FIG. 8A. When a customer 110 places a Calling Card call, the call is routed to an Operator Services System (OSS) 112 which launches a query through an SS7 Common Channel Signaling Network (CCSN) 114. The query is delivered to an SCP 117 which contains the LIDB application. The LIDB provides routing information, such as identifying the customer-specified carrier which is to deliver the call, as well as screening functions such as Calling Card validation used to authorize a call. The SCP 117 returns the appropriate LIDB information to the OSS 112 so that the call can be completed. More detail on LIDB functions is presented in an APPENDIX to this description.

Figure 8B:
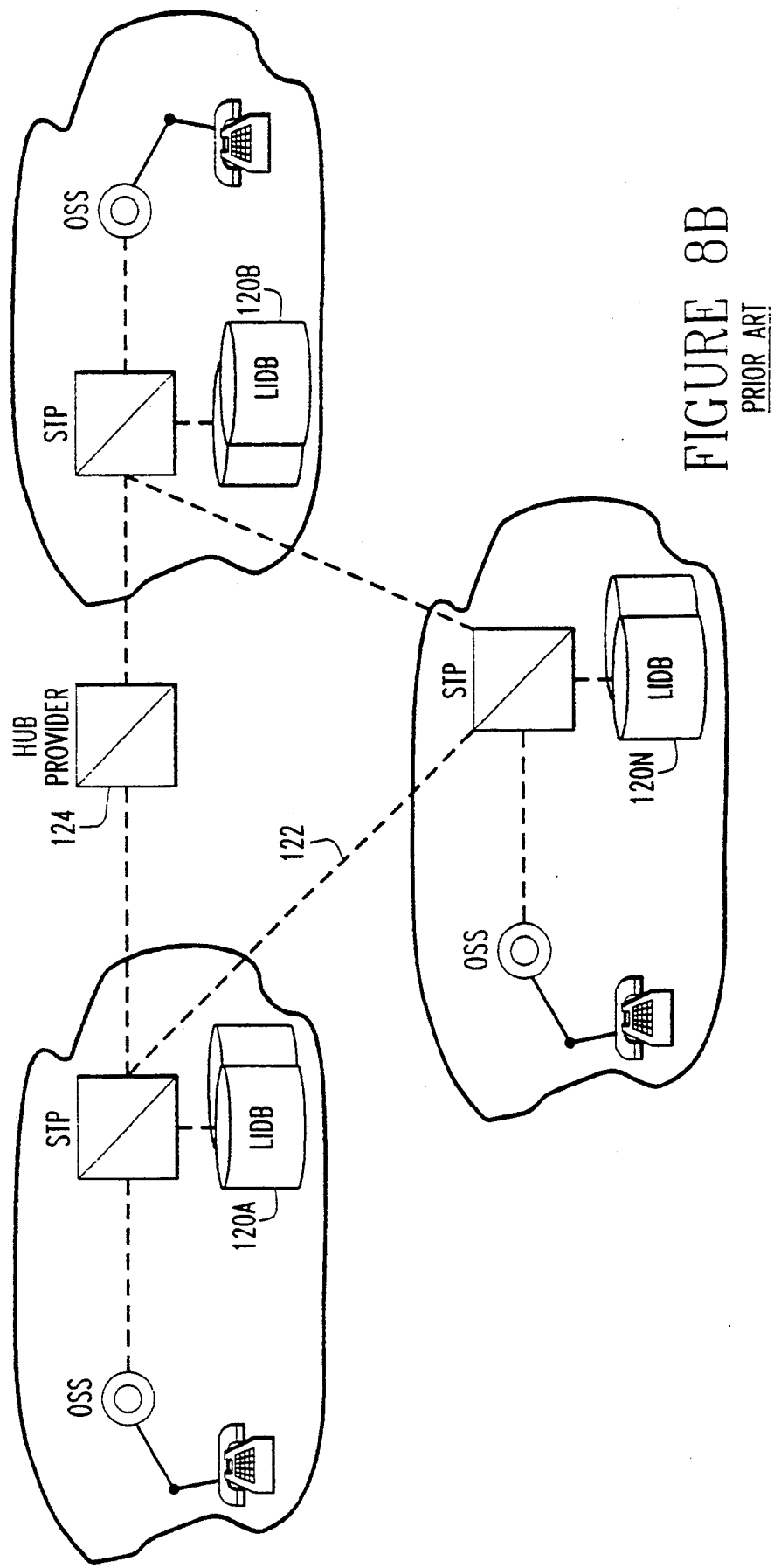

LIDB data bases 120A, 120B–120N in FIG. 8B are part of the national infrastructure. The LIDB of each local exchange carrier (LEC) contains the line records and Calling Card records for that LEC. It is possible to query any LIDB in the country from any OSS in the country because the LEC common channel signaling networks are interconnected either directly 122 or through hub Signal Transfer Points (STPs) 124. Each LIDB data base is supported by one or more Data Base Administration Systems (DBAS) 126, as shown in FIG. 8C. The DBAS 126 accepts service order information 128 through a mechanized interface 129 from service order systems, in batch form from tape 132, or interactively from a terminal 134. The existing DBAS systems are currently being replaced with a new system called DBAS II. However, the major system interfaces are unchanged by this field update.

With reference again to the specific preferred embodiment (FIG. 4), the BIN 50L is provided with most system elements being like those described for the BIN 50 of FIG. 1, and like reference characters are accordingly employed as applicable. In this case, the resource system 63 includes the data base 63A in the form of a LIDB 150 which is directly connected to the ATM port 70P. For system reliability, a backup LIDB 150B is also provided with a direct connection to ATM port 70PB. As indicated in FIG. 1, the LIDB 150 or 150B may also be connected to circuit-switched network elements through SS7 and X.25 links.

Figure 4:
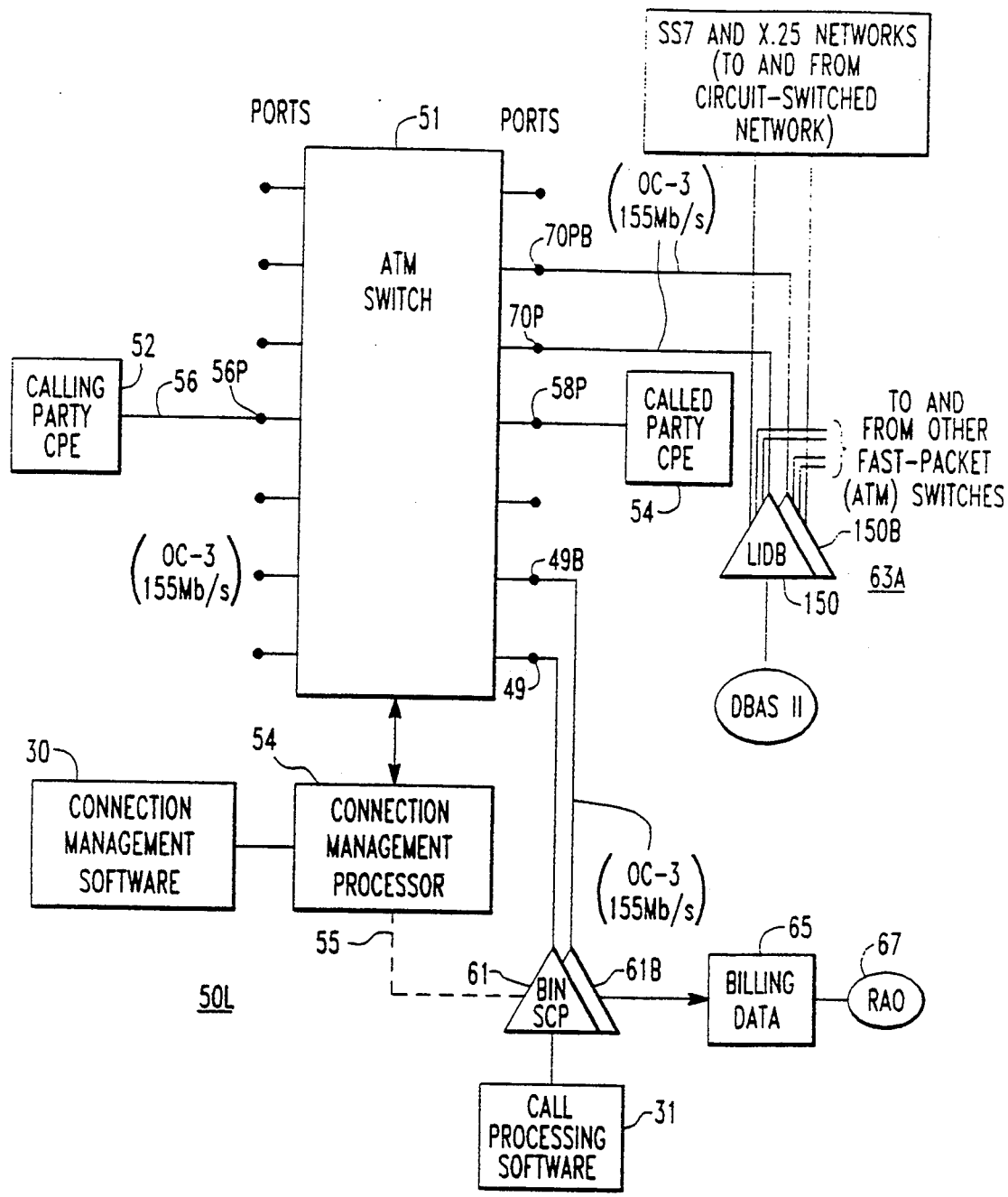
FIG. 4 is an enlarged system block diagram of a BIN similar to the BIN of FIG. 1 but including a LIDB as a preferred specific data base.

With respect to LIDB connections to other ATM switches (not shown), i.e., switches other than the ATM switch 51, direct connections can be made from the LIDBs 150 and 150B as indicated in FIG. 4. However, from an economic standpoint, it is preferred that LIDB connections be made to other ATM switches through the ATM switch 51 and the ATM switch network with the use of permanent ATM switch virtual connections.

Figure 9A:
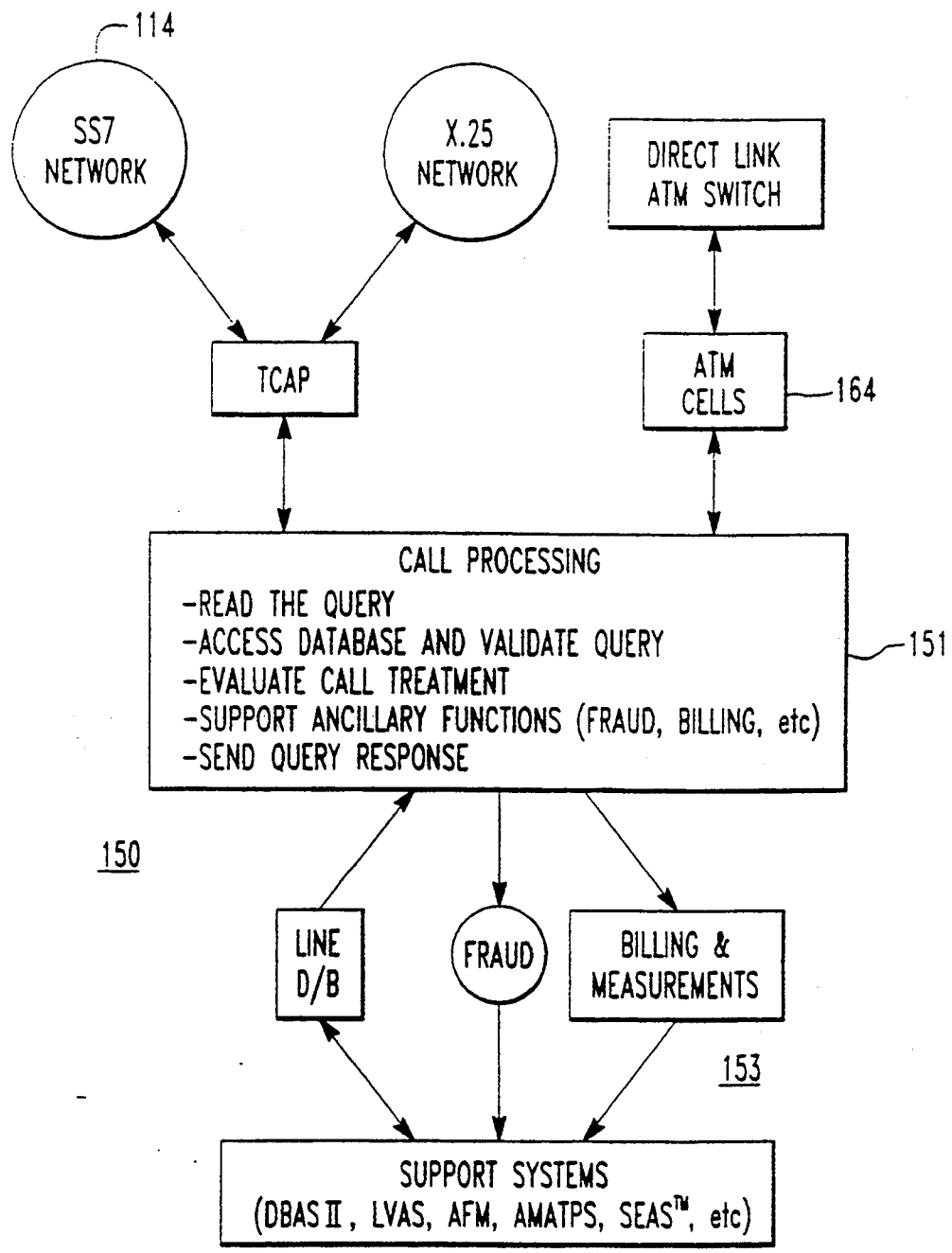
FIG. 9A is a system and functional block diagram illustrating a LIDB system adapted for operation in a BIN or BAIN in accordance with the invention.

The LIDB 150, as shown in FIG. 9A, is structured for operation with the circuit-switched telephone network in the prior art manner just described, and it is structurally adapted for operation in the BIN 50L, thereby making LIDB data base support available in fast-packet networks, thus facilitating fast-packet system call handling. Further, substantial economic value can be realized in fast-packet networks by using the existing LIDB infrastructure of the circuit-switched telephone network.

Figure 9B:
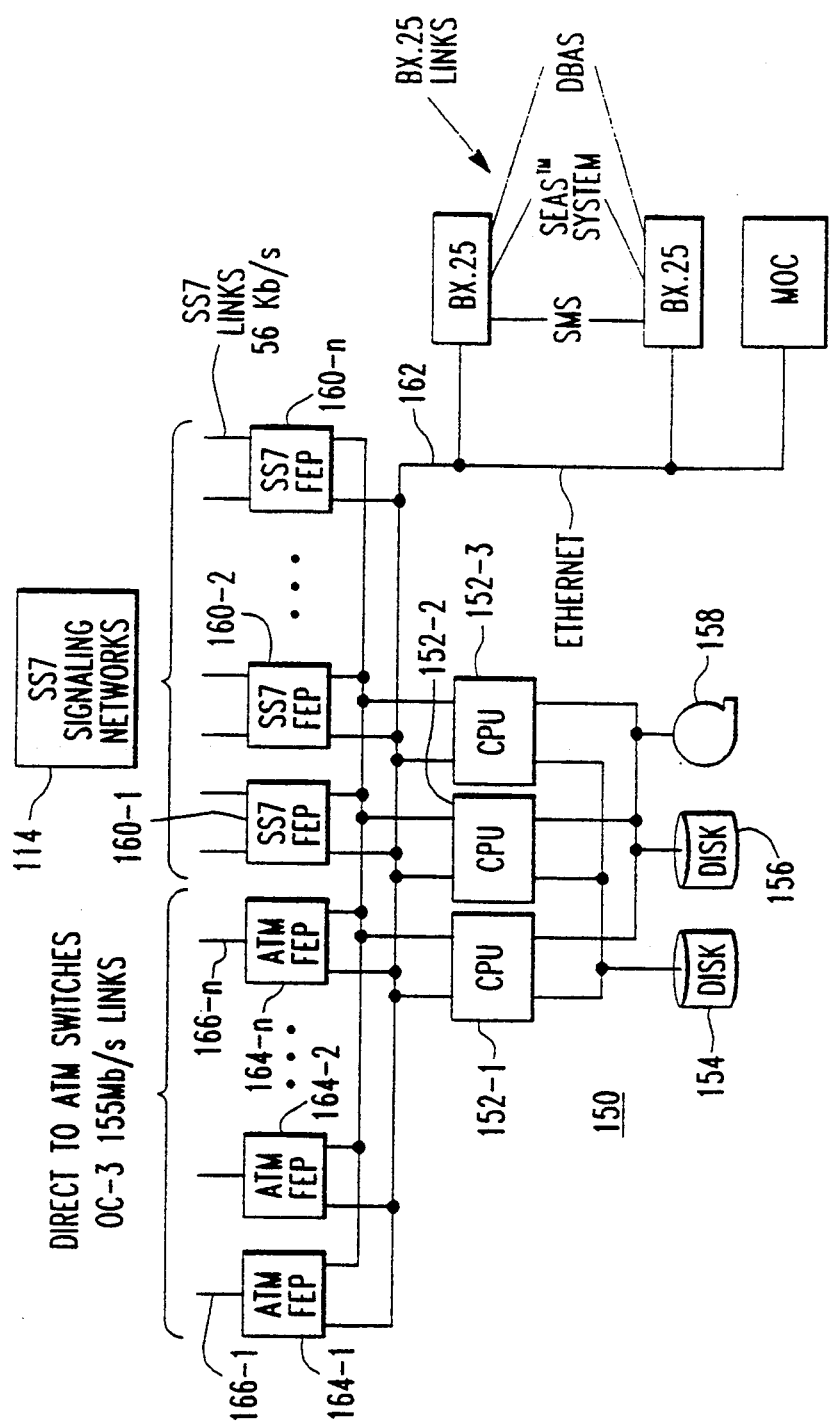
FIG. 9B shows the LIDB of FIG. 9A in greater detail including a preferred interface with a BIN or BAIN in accordance with the invention.

The LIDB 150 employs a call processing program 151 to read and process queries and develop return responses. A memory system (FIG. 9B) includes disks 154 and 156 (as required for the large size of the data base) and a tape unit 158. Front-end processors 160-1, and 160-2 through 160-n are coupled to the SS7 signaling network 114 and are linked to the processors 152 through an ethernet network 162.

In this illustrative embodiment, ATM front end processors (FEPs) 164-1, and 164-2 through 164-n are directly linked, preferably through OC-3 155 Mb/s links 166-1 through 166-n, to ATM switches in the BIN 50L. The FEPs 164 are linked to the LIDB processors 152 through the local area networks 162 and provide the necessary interface for processing cells to and from the ATM switches. The LIDB 150 provides data base support for the BIN 50L through the OC-3 links 166.

In the BIN 50L (FIG. 4), billing validation during call set up is conducted as follows. When an ATM customer launches a signaling cell to the BIN-SCP 61 for network controlled service, the requested service is contained in the cell payload along with the required billing address information. If the call is a Calling Card or collect call or a bill-to-third-number call, the BIN-SCP 61 launches a query, packaged as a query cell, preferably through a permanent virtual channel established in the ATM switch 51 which connects the BIN-SCP 61 to the LIDB 150.

The LIDB 150 then performs a carrier identification function (assuming the billed party has a preferred carrier) as well as a billing validation function. The latter involves either validating a Calling Card number or performing a billed number screening function for collect or bill-to-third-party calls.

The LIDB 150 then provides a response, packaged as an ATM response cell, through the permanent virtual channel of the ATM switch 51 to the BIN-SCP 61. Call processing then continues, as usual, with the BIN-SCP 61 launching a command cell through the ATM port 49 to the Connection Management Processor 54 in order to establish a switched virtual circuit in the ATM switch 51 between the calling and called parties. The described procedure permits LIDB billing validation to be accomplished in less than 50 milliseconds, most of which is required for disk access in the LIDB 150.

The existing LIDBs in the circuit-switched network provide a 500 millisecond response time. The use of ATM cell queries in providing network service control in a BIN in accordance with the present invention reduces response time by a factor of 10.

Figure 10A:
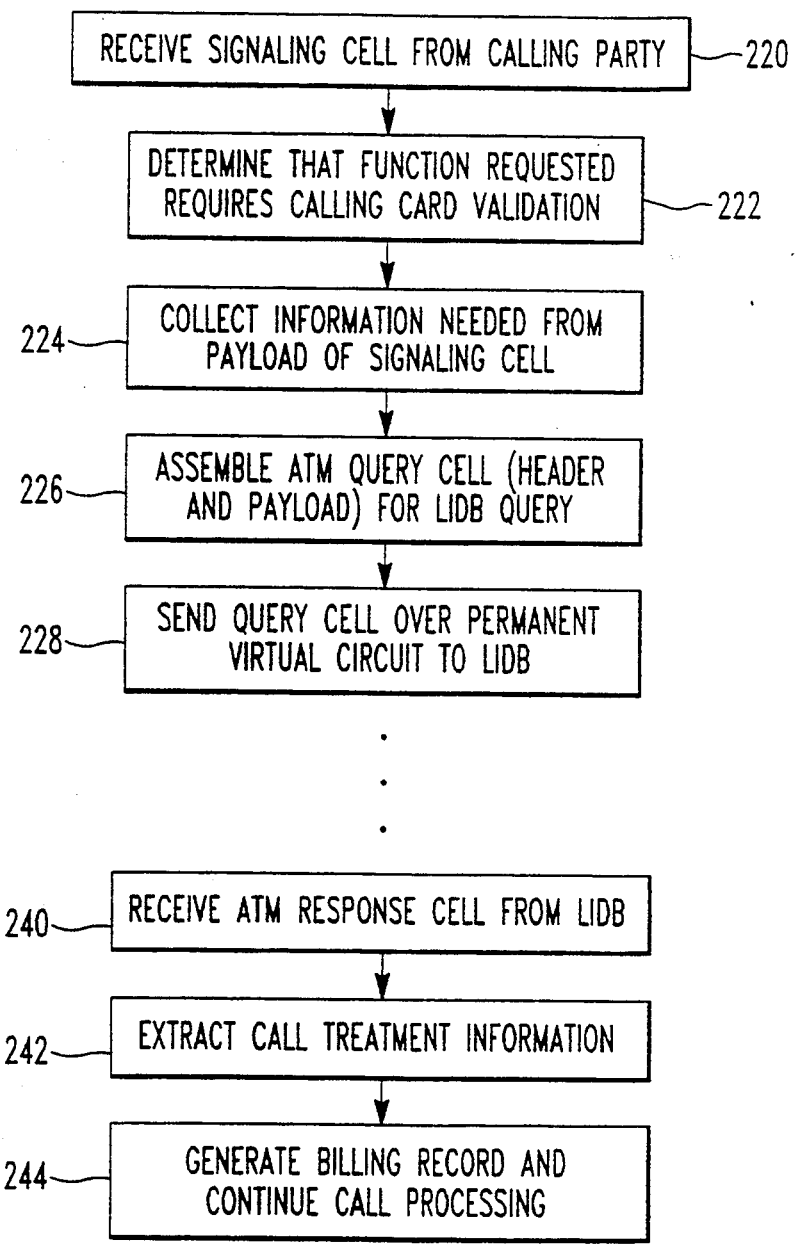
FIG. 10A is a functional block diagram illustrating a data base request procedure employed in a BIN-SCP of FIG. 4.
Figure 10B:
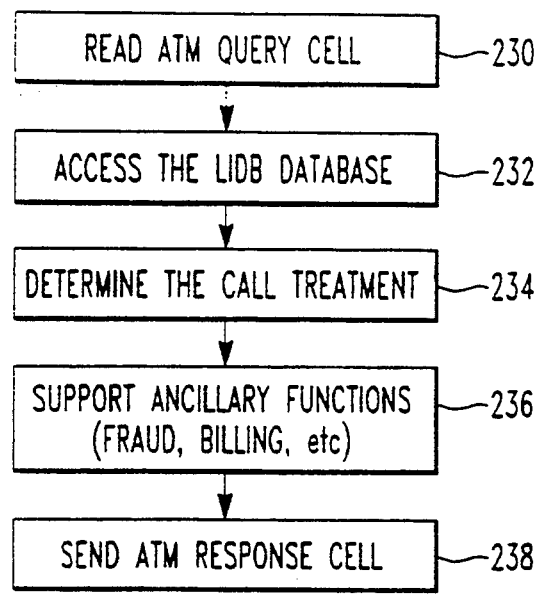
FIG. 10B is a functional block diagram illustrating a data base response procedure employed in the LIDB of FIG. 9B.

FIGS. 10A and 10B are flow charts representing Calling Card validation functions performed by the BIN-SCP 61 and the LIDB 150 during execution of call processing procedures therein. Thus, in FIG. 10A, the BIN-SCP 61 receives a signaling cell from the calling party as indicated by block 220. Next, a determination is made that the function requested requires Calling Card validation in block 222.

After needed information is collected from the payload of the signaling cell in block 224, an ATM query cell is assembled in block 226 for a LIDB query. As indicated by block 228, the query cell is sent through a permanent virtual connection of the ATM switch 51 to the LIDB 150.

In the LIDB 150 (FIG. 10B), the ATM query cell is read and the LIDB database is accessed as indicated by blocks 230 and 232. Call treatment is determined and support ancillary functions are performed as indicated by blocks 234 and 236. Finally, in block 238, one or more ATM response cells are assembled and sent to the BIN-SCP 61 through the ATM switch 51. The response cells can include billing information for use of the LIDB which thus can be included by the BIN-SCP 61 in network billing to the customer.

With reference again to FIG. 10A, the ATM response cells received by the BIN-SCP 61 and call treatment information is extracted as indicated by blocks 240 and 242. Finally, in block 244, a billing record is generated and call processing is continued to establish a connection through the ATM switch 51 as previously described. With inclusion of billing data for use of a resource or data base unit, as described for the case of a LIDB unit, charges for resource unit use can be included in a network billing to the customer as a service to the owner of the resource unit.

Figure 2:
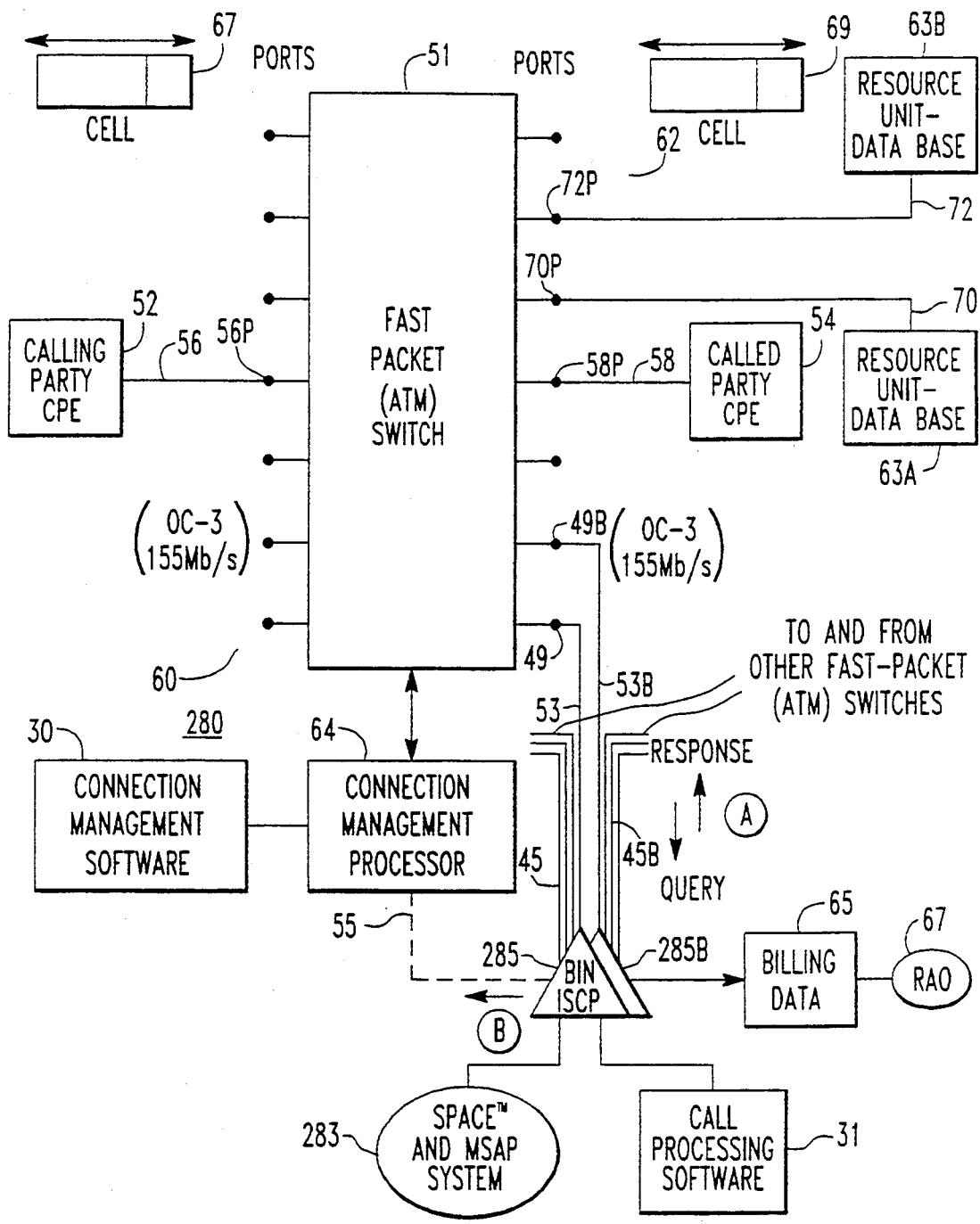
FIG. 2 is a system block diagram of a broadband advanced intelligent network (BAIN) employing a fast-packet or ATM switch arranged in accordance with the invention in another preferred embodiment in which a resource system is integrated to provide support for network-controlled services.

In another embodiment of the invention shown in FIG. 2, a BIN Integrated Service Control Point (BIN-ISCP) 285 or 285B is interfaced directly with the ATM switch 51 in a broadband advanced intelligent network 280 and provides network control in the manner described for the BIN-SCP 61 or 61B. Like reference characters are employed for like elements in FIGS. 1 and 2. Command cells are generated by the BIN-ISCP 285 or 285B and transmitted through the switch port 49 or 49B, thereby populating the translation or lookup table 39. Switched virtual connections are thus established and terminated for voice, data, image, and video communication cells as previously described. Command data may alternatively be transmitted through the link 55. In addition, the BIN-ISCP 285 can communicate using signaling cells with either the calling party's CPE 52 or called party's CPE 54. Network control of the data bases 65A and 65B by the BIN-ISCP 285 is performed as described for the BIN-SCP 61.

The BIN 280 of FIG. 2 differs from the BIN of FIG. 1 principally through the provision of a SPACE® System 283 and appropriate SCP structuring to provide for rapid creation of new network services.

Figure 11:
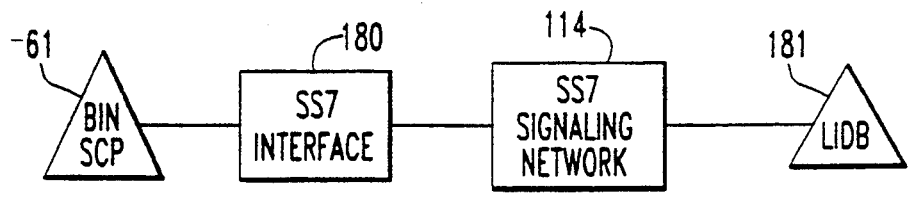
FIG. 11 illustrates an alternative embodiment of the invention in which a BIN-SCP is coupled to the LIDB system of FIG. 9A through an 557 signaling network.
Figure 1:
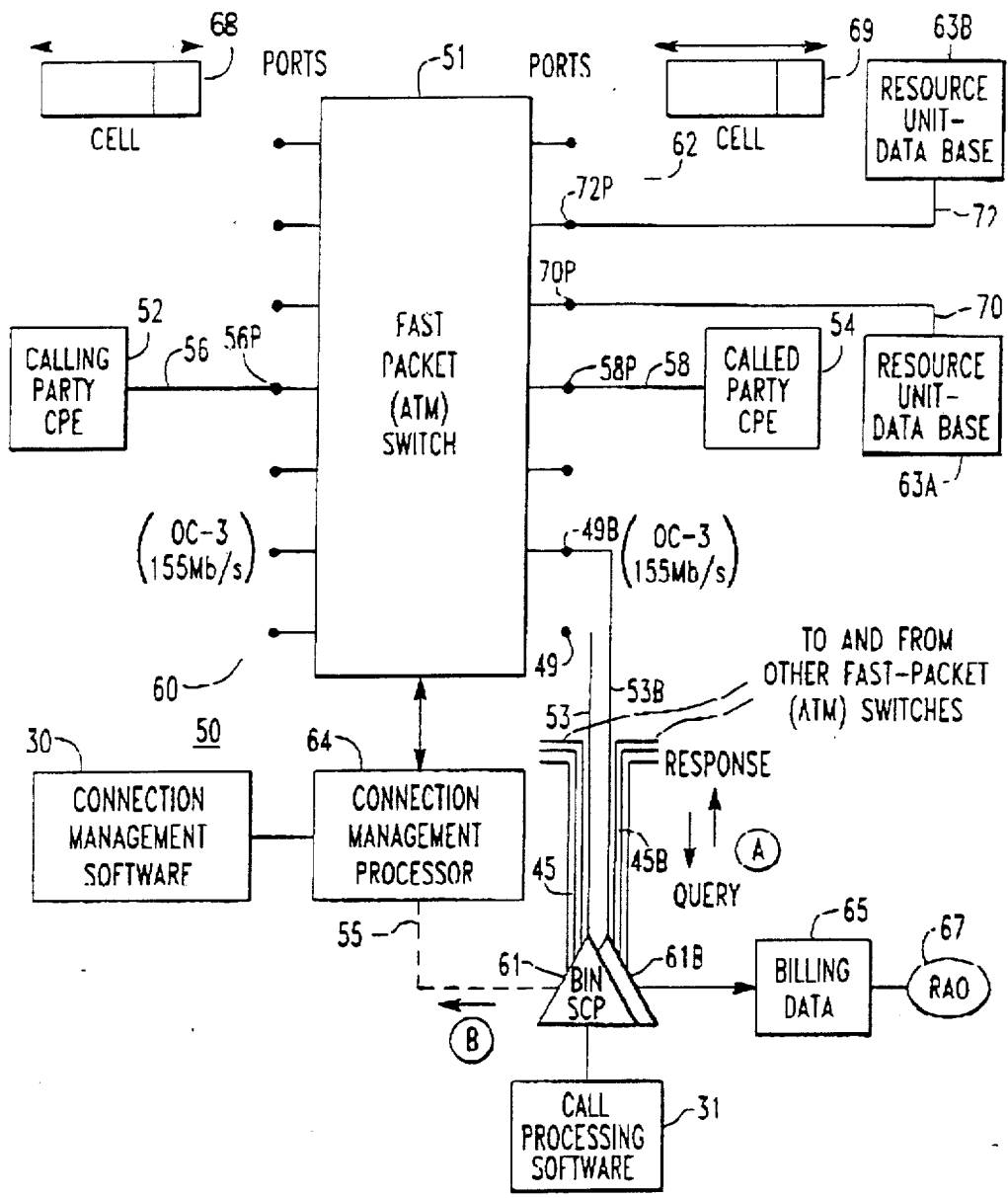
Figure 2:
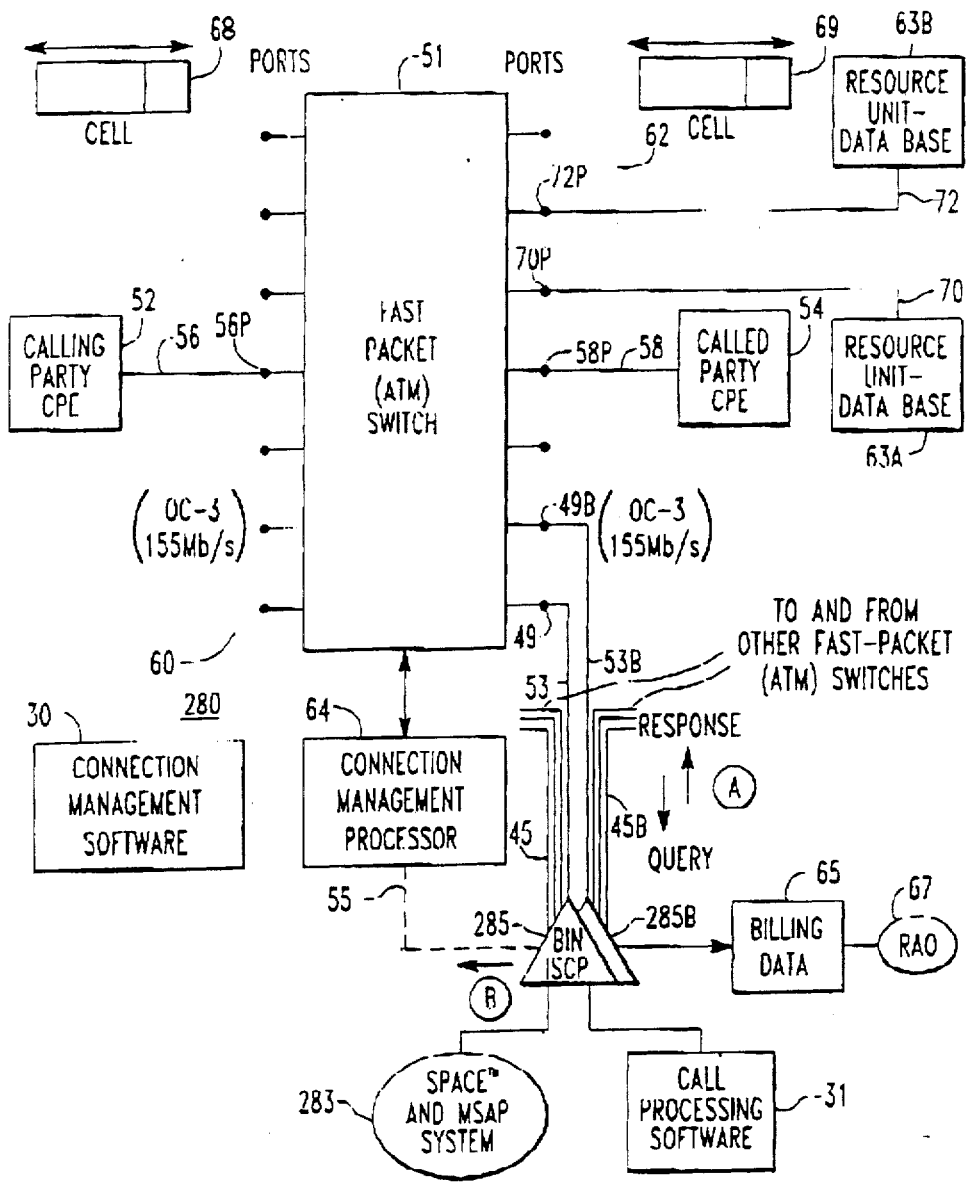

In FIG. 11, there is shown another embodiment of the invention in which a BIN 50S includes the BIN-SCP 61 which is coupled through a 56 Kb/s SS7 interface 180 and the SS7 signaling network 114 to a LIDB 181. The BIN 50S is otherwise structured like the BIN 50 of FIG. 1. In this embodiment, the BIN-SCP 61 emulates an OSS to launch TCAP queries to any LIDB in the United States for billing validation or other services. Other data bases in the BIN 50 may also be directly coupled to the BIN-SCP 61 through the SS7 signaling network 114. Responses to the queries are transmitted by the LIDB through the SS7 signaling network 114 to the BIN-SCP 61.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

APPENDIX
LIDB QUERY/RESPONSE DATA ELEMENTS

| Query Elements | Successful Response Elements |
| --- | --- |
| Calling Card Validation | |
| Billing Number | Company ID |
| Calling Card PIN | Record Status Indicator |
| Called Number | Calling Card Sub-Account Number |
| Calling Number (ANI) | PIN Restriction Indicator |
| | Revenues Accounting Office |
| | Primary Preferred IC Indicator |
| | Alternate Preferred IC Indicator |
| | Preferred International Carrier Indicator |
| Billed Number Screening | |
| Billing Number | Company ID |
| Called Number | Record Status Indicator |
| Calling Number (ANI) | Collect Acceptance Indicator |
| | Third Number Acceptance Indicator |
| | Treatment Indicator |
| | Service or Equipment Indicator |
| | Intercept Indicator |
| | Revenue Accounting Office |
| | Primary Preferred IC Indicator |
| | Alternate Preferred IC Indicator |
| | Preferred International Carrier Indicator |
| Calling Name Delivery | |
| Calling Directory Number (usually ANI) | Name |
| | Privacy Indicator |

What is claimed is:

1. A method for operating a broadband intelligent network having customer apparatus coupled to predetermined ports of a fast-packet switch through connections having a broad digital bandwidth; a network service control processor connected to at least one fast-packet switch port; at least one resource unit of a network resource system connected directly to another fast-packet switch port; the steps of the method comprising:

detecting customer signaling cells received by the fast-packet switch from customer apparatus and routing customer signaling cells from the fast-packet switch to the network service control processor through the one switch port;

detecting service request data in each signaling cell received by the network service control processor and requiring support of the one resource unit and generating an output query cell requesting information needed from the one resource unit;

routing the query cell from the network service control processor to the one resource unit through the fast-packet switch;

generating a response cell containing the requested information from the one resource unit; and sending the response cell from the one resource unit to the fast-packet switch.

2. The method of claim 1 further comprising the step of establishing a permanent virtual connection between the one resource unit and the network service control processor.

3. The method of claim 2 wherein the query cell is routed to a network address defined as the network service control processor, the one resource unit is a data base, and the steps of the method further comprising:

routing the response cell from the fast-packet switch to the network service control processor; and completing processing of the customer service request in the network service control processor.

4. The method of claim 3, wherein a second data base is interfaced to the network service control processor through a common channel signaling system, the steps of the method further comprising:

sending queries from the network service control processor to the other data base and responses from the other data base to the network service control processor through the signaling system for requested services requiring support from the second data base.

5. The method of claim 1 wherein a plurality of resource units are connected to the other port and respective additional ports of the fast-packet switch; the steps of the method further comprising:

selecting at least one of the resource units required for support of the associated customer service request on the basis of information in each customer generated signaling cell;

generating a query cell for output from the network control processor for each service request;

routing query cell through the fast-packet switch to the resource unit selected therefor; and generating a response cell containing requested information in response to data in the query cell.

6. The method of claim 3 wherein at least one other network service control processor is coupled to the one data base, and the steps of the method further comprise:

tracking each query cell sent to the one data base to enable the one data base to identify the network service control processor from which it originated.

7. A method for operating a broadband intelligent network having customer apparatus coupled to predetermined ports of a fast-packet switch through connections having a broad digital bandwidth; a network service control processor connected to at least one fast-packet switch port; at least one data base of a network resource system connected through a common channel signaling system to the network service control processor; the steps of the method comprising:

detecting customer signaling cells received by the fast-packet switch from customer apparatus and routing customer signaling cells to the network service control processor through the one switch port;

detecting service request data in each signaling cells received by the network service control processor and requiring support of the one data base and generating at least one output query requesting data from the one data base;

routing the query through the signaling system to the one data base;

generating a response containing the requested data from the data base; and routing the response from the one data base through the signaling system to the service control processor.

8. The method of claim 1 further comprising the step of directly routing a query cell from the network service control processor to at least one other fast-packet switch.

9. The method of claim 3 wherein at least some of the customer generated signaling cells each carry a request for a connection between a calling party and a called party, and the data base is a line information data base (LIDB) employed in a circuit-switched network and adapted for operation with the broadband intelligent network, and the LIDB is directly coupled to the other port of the fast-packet switch; and wherein the method steps further comprise:

generating and transmitting a query cell to the LIDB through the fast-packet switch, for each connection-request signaling cell, the query cell requesting information needed for call connection service;

generating a LIDB response cell including the information needed for call connection service and transmitting the LIDB response cell from the LIDB to the fast-packet switch;

routing the LIDB response cell from the fast-packet switch to the network service control processor; and if the call is authorized, generating at least one output command cell for output from the network service control processor and transmitting the command cell to the fast-packet switch to establish a switched virtual connection between the switch ports of the calling and called parties.

10. The method of claim 9 wherein information in the LIDB response cell includes information required for Calling Card validation, originating line number screening, calling name delivery and/or billed number screening, the action taken by the network service control processor being dependent on the information contained in the response cell.

11. A broadband intelligent network comprising:

a fast-packet switch having a plurality of ports;

a switch processor for managing port connections to establish switched or permanent virtual connections between ports;

respective customer links having a broad digital bandwidth connected to predetermined customer switch ports for transporting signaling and data cells to and from customer apparatus;

a network control processing system interfaced to at least one switch port to receive customer generated signaling cells carrying customer service request data and to control network responses thereto;

a network resource system having at least one resource unit;

the one resource unit interfaced to a resource unit port of the fast-packet switch to receive query cells from the network control processing system and to transmit response cells thereto;

the switch processor detecting each customer generated signaling cell received by the fast-packet switch and routing each customer generated signaling cell to the network control processing system through the one switch port;

the network control processing system detecting service request data in each received signaling cell requiring support of the one resource unit and generating at least one output query cell requesting information from the resource unit needed for support of the requested service;

the network control processing system routing the query cell to the resource unit through the fast-packet switch;

the resource unit generating a response cell containing the requested information in response to data in the query cell; and the resource unit routing the response cell to a defined network address through the fast-packet switch.

12. The network of claim 11 wherein the switch processor establishes a permanent virtual connection between the resource unit and the network control processing system.

13. The network of claim 11 wherein:

the fast-packet switch sends the response cell to the network control processing system;

the resource unit is a data base; and the network control processing system acts on the information in the response cell to provide further processing of the customer service request.

14. The network of claim 13 wherein the resource system includes a plurality of data bases connected to respective data base ports of the fast-packet switch;

the network control processing system acting on information in each customer generated signaling cell to select at least one of the data bases required for support of the associated customer service request; and the network control processing system generating an output query cell for each service request, each query cell addressed to the data base selected therefor and sent to the fast-packet switch for routing to the selected data base.

15. The network of claim 13 wherein at least a second data base is provided, and a common channel signaling system is provided to couple the network control processing system to the second data base, the network control processing system sending queries to and receiving responses from the second data base through the signaling system.

16. The network of claim 11 wherein the fast-packet switch is an ATM switch and the network control processing system is a service control point.

17. The network of claim 11, wherein the fast-packet switch is an ATM switch and the network control processing system is an integrated service control point including a system for creating network procedures that implement requested new network services when executed by the network control processing system in response to signaling cell requests for the execution of such services.

18. A broadband intelligent network comprising:

a fast-packet switch having a plurality of ports;

a switch processor for managing virtual port connections to establish switched or permanent virtual connections between ports;

respective customer links having a broad digital bandwidth connected to predetermined customer switch ports for transporting signaling and data cells to and from customer apparatus;

a network control processing system interfaced to at least one of the switch ports to receive customer generated signaling cells carrying customer service request data and to control network responses thereto;

a network resource unit system having at least one data base;

the switch processor detecting each customer generated signaling cell received by the fast-packet switch and routing each customer generated signaling cell to the network control processing system through the one switch port;

the network control processing system detecting service request data in each received signaling cell requiring support of the one data base and generating at least one output query requesting data from the one data base needed for support of the requested service;

a signaling system coupling the network control processing system to the one data base;

the network control processing system sending queries to and receiving responses from the one data base through the signaling system.

19. The network of claim 11 wherein the resource unit is a data base, at least some of the customer generated signaling cells each carry a request for a connection between a calling party and a called party, the data base is a line information data base (LIDB) employed in a circuit switched network and adapted for operation with the broadband intelligent network, and the LIDB is directly coupled to the resource unit of the fast-packet switch; and the network further comprises:

the network control processing system generating and transmitting a query cell to the LIDB through the fast-packet switch, for each connection request signaling cell, the query cell requesting information needed for call connection service;

the LIDB generating a response cell including information needed for call connection service in response to data in the query cell and transmitting the response cell to the network control processing system through the fast-packet switch;

the network control processing system completing the call processing and generating at least one output command cell in response to data in the response cell; and the network control processing system transmitting the command cell to the fast-packet switch which establishes a switched virtual connection between the switch ports of the calling and called parties.

20. The network of claim 19 wherein information in the response cell includes information required for Calling Card validation, originating line number screening, calling name delivery and/or billed number screening.

21. The network of claim 19 wherein the switch processor establishes a permanent virtual connection between the data base and the network control processing system.

22. The network of claim 21 wherein the fast-packet switch is an ATM switch and the network control processing system is a service control point.

23. The network of claim 21 wherein the fast-packet switch is an ATM switch and the network control processing system is an integrated service control point including a system for creating network procedures that implement requested new network services when executed by the network control processing system in response to signaling cell requests for execution of such services.

24. The network of claim 20 wherein the network control processing system creates a billing record from cell data for each service request.

25. A broadband intelligent network comprising:

means for switching data packet, the switching means having a plurality of ports;

means for managing connections between the ports to establish switched or permanent virtual connections between the ports;

means for coupling customer apparatus through connections having a broad digital bandwidth to predetermined switch ports to transport cells to and from the customer apparatus;

means for processing customer service request data extracted from received signaling cells and providing network-controlled responses thereto;

means for interfacing the network control processing means to at least one of the switch ports;

the managing means detecting each signaling cell received by the fast-packet switching means and routing each signaling cell to the processing means through the one switch port;

the managing means detecting each customer signaling cell received by the fast-packet switching means and routing each customer signaling cell to the processing means through the one switch port;

means for controlling at least one resource unit of a network resource system;

the resource unit controlling means directly connected to a resource unit port of the fast-packet switching means to receive query cells from the processing means and to transmit responses thereto;

the processing means detecting service request data in each received signaling cell requiring support of the one resource unit and generating at least one output query cell requesting information needed from the one resource unit for support of the requested service and routing the query cell through the fast-packet switching means to the one resource unit;

the resource unit controlling means generating a response cell containing requested data in response to data in the query cell and routing the response cell to a defined network address through the fast-packet switching means.

26. The network of claim 25 wherein the managing means establishes a permanent virtual connection between the data base controlling means and the processing means and wherein the fast-switching means sends the response cell to the processing means; and the processing means providing further processing of the customer service request in response to data in the query cell.

27. The network of claim 25 wherein the network resource system includes a plurality of resource units having respective controlling means connected to respective resource unit ports of the fast-packet switching means;

the processing means selecting at least one of the resource units required for support of the associated customer service request in response to data in each customer generated signaling cell; and the processing means generating an output query cell for each service request, each query cell addressed to the resource unit selected therefor and sent to the fast-packet switching means for routing to the controlling means associated with the selected resource unit.

28. The network of claim 25 wherein at least some of the customer generated signaling cells each carry a request for a connection between a calling party and a called party, the resource unit is a data base, and the data base is a line information data base (LIDB) employed in a circuit-switched network and adapted for operation with the broadband intelligent network and directly coupled to the resource port of the fast-packet switching means; and the network further comprises:

the processing means generating and transmitting a query cell to the LIDB through the fast-packet switching means, for each connection request signaling cell, the query cell requesting information needed for call connection service;

the controlling means generating a response cell including the information needed for call connection service and transmitting the response cell to the processing means through the fast-packet switching means; and the processing means generating at least one output command cell in response to data in the response cell and transmitting the command cell to the fast-packet switching means which establishes a virtual connection between the switch ports of the calling and called parties.

29. The network of claim 28 wherein information in the response cell includes information required for Calling Card validation, originating line number screening, calling name delivery and/or billed number screening.

30. The network of claim 25 wherein means are provided for creating a billing record from cell data received by the processing means for each service request.

31. The network of claim 25 wherein the fast-packet switch means sends the response cell to the processing means, the response cell includes billing information based on use of the resource unit, and the processing means providing, in response to data in the response cell, further processing of the customer service request including creating a billing record that includes the resource unit billing information.

32. The network of claim 31 wherein the one resource unit is a line information data base employed in a circuit-switched network and adapted for operation with the broadband intelligent network and directly coupled to a resource unit port of the fast-packet switching means, and the network further comprises:

the processing means generating and transmitting a query cell to the LIDB through the fast-packet switching means, for each connection request signaling cell, the query cell requesting information needed for call connection service;

the controlling means generating a response cell including the information needed for call connection service and transmitting the response cell to the processing means through the fast-packet switching means; and the processing means generating at least one output command cell in response to data in the response cell and transmitting the command cell to the fast-packet switching means which establishes a virtual connection between the switch ports of the calling and called parties.

* * * * *

UNITED STATES PATENT AND TRADEMARK OFFICE
CERTIFICATE OF CORRECTION

PATENT NO. : 5,392,402
DATED : February 21, 1995
INVENTOR(S) : Richard B. Robrock, II It is certified that error appears in the above-identified patent and that said Letters Patent is hereby corrected as shown below:

Column 5, line 2: After "at" change "67" to -- 68 --.

Column 6, line 46: After "cells" change "67" to -- 68 --.

Column 8, line 37: After "SCP" change "117" to -- 116 --;
line 42: After "SCP" change "117" to -- 116 --.

Column 9, line 4: After "Fig." change "1" to -- 4 --.

Column 10, line 60: After "bases" change "65A" to -- 63A --,
After "and" change "65B" to -- 63B --.

Column 12, line 12: After second occurrence of "the" change "query" to -- response --;
line 64: After "signaling" change "cells" to -- cell --.

Column 16, line 7: After "data" change "packet" to -- packets --.

Column 18, line 4: Before "means" change "switch" to -- switching --.

Sheet 1 of 13 and 2 of 13 should be deleted to appear as per atttached.

Signed and Sealed this

Seventh Day of November, 2000

Attest:

Q. TODD DICKINSON

Attesting Officer

Director of Patents and Trademarks